March 1, 1949.　　　A. S. HEGGEN　　　2,462,964
AUTOMOBILE TRAILER
Filed April 16, 1946
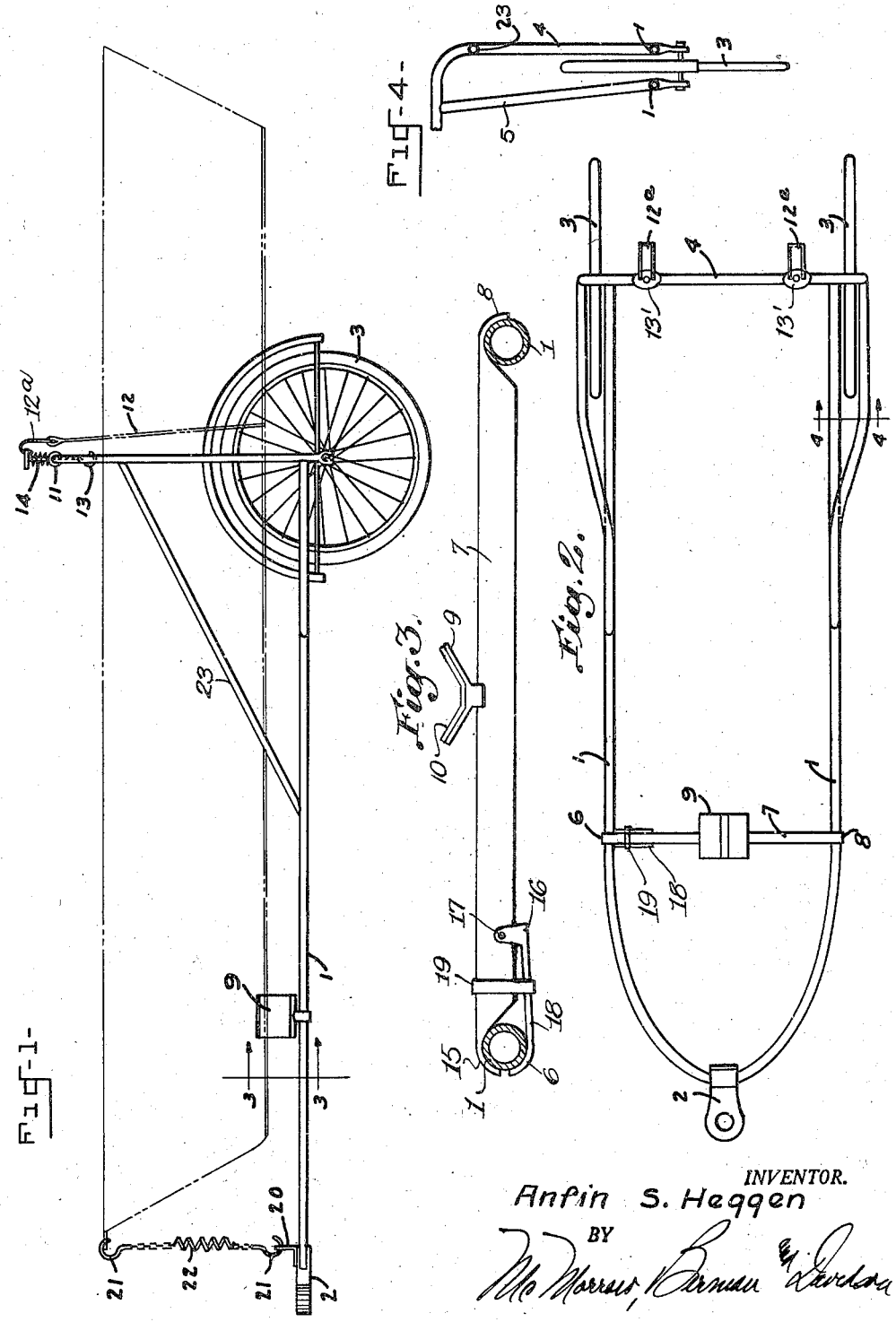
INVENTOR.
Anfin S. Heggen

Patented Mar. 1, 1949

2,462,964

UNITED STATES PATENT OFFICE 2,462,964

AUTOMOBILE TRAILER

Anfin S. Heggen, Madison, Wis.

Application April 16, 1946, Serial No. 662,640

2 Claims. (Cl. 280—33.4)

The present invention relates to automobile trailers and is more particularly concerned with a trailer for transporting small boats.

The primary object of the invention is to provide a simply constructed and durable trailer frame out of metallic tubing.

Another object of the invention is to provide novel means for securing a boat on the trailer.

With the foregoing and other objects and advantages in view the invention consists of the novel construction and arrangement of parts hereinafter described and claimed.

In the accompanying drawing illustrating the preferred embodiment of the invention—

Figure 1 is a side elevation of the trailer.

Figure 2 is a top plan view of the same.

Figure 3 is a section on the line 3—3 of Figure 1.

Figure 4 is a section on line 4—4 of Figure 2.

Like numerals in the description and drawing designate the same parts of construction.

The frame of the trailer is constructed preferably of steel tubing and comprises two side members 1 converging at the front on the hitching tongue 2. At the rear ends forks are provided for reception of the rubber-tired trailer wheels 3. The latter are provided with conventional fenders, if desired. Pieces of tubing are welded on the inside of the side members 1 to form said forks. Inclined braces, on sides 1, support an arched member 4.

The arched member 4, of suitable steel tubing, is welded adjacent the lower extremities of its two depending branches to the rear ends of side members 1, being the outside branches of the said forks. Perpendicular sections 5 of tubing 5 are welded to the inside branches of the forks adjacent said sections lower extremities and to the horizontal or cross portion of the arched member. Suitable friction bearings are provided in the lower extremities of elements 4 and 5 for the axles of the trailer wheels.

A transversely disposed cradle bar 7 is adjustably and detachably secured to the side members 1 by a clip 6 and supports a cradle 9 at a location to receive the front end portion of the keel of a small boat carried by the trailer. The opposite end of this bar is shaped in the form of a hook 8 to fit on the main frame. Midway of bar 7 the boat cradle 9 is welded on and provided with a suitable pad 10. This cradle is designed to support the fore part of the boat, shown in dotted lines in Figure 1.

Two collars 11 are mounted on the horizontal portion of the arched member 4 and suitably spaced apart to serve as suspension points for an adjustable sling strap 12 to pass under the hull and support the aft end of the boat. Each of said collars is provided with vertical apertures which register with holes in arched member 4.

The shanks of hooks 13 project upwardly through said collars and are provided with threaded oval heads 13' which confine coiled springs 14 mounted on said shanks above the collars. The said heads have one or more holes for the reception of hooks on links 12—a on the ends of sling strap 12. The hooks 13 are designed to engage ring bolts on the boat gunwales.

The clip 6 is constructed to render the cradle bar movable relative to the side members and detachable therefrom. To attain this, a hook 15 is formed on the end of the cradle-bar 7 and pivotally secured to the bar 7 by ears 16 and pivot pins 17 is a hinged plate 18 with a hook on the outer end adapted to engage the main frame 1 in conjunction with the opposing hook 15. A slidable keeper ring 19 on bar 7 is designed to release the hooks or to fasten same to the main frame side member 1. The tongue 2 is provided with a perforated angle-plate 20 for attachment of one of the hooks 21' of a spring-and-hook shackle 22 to fasten down the bow.

Braces 23 extend between the side frame members 1 and the arch member 4 each having its front end secured to the corresponding side frame member intermediate the length thereof and its rear end connected to arch member 4 above the corresponding wheel-receiving fork at the rear end of the side frame member.

As different embodiments may be made of this inventive concept and modifications may be made in the embodiment hereinbefore shown and described, it will be understood that the matter herein is to be interpreted as illustrative merely, and not in a limiting sense.

What I claim is:

1. A boat trailer comprising a pair of longitudinal side members having rear portions substantially parallel to each other and curved, converging front portions, a towing eye secured to the front ends of both side members, a generally U-shaped member secured at its ends to the rear ends respectively of said side members and extending above said side members substantially perpendicular thereto to provide a boat-supporting arch, a member secured to the rear portion of each side member and spaced from the outer side thereof to provide wheel-receiving forks, a brace secured between the inner member of each fork and the upper portion of said arch, said braces and the ends of said arch extending below said side members and receiving bearings to journal respective wheels in said forks, a brace extending from the intermediate portion of each side member to the upper portion of said arch to firmly support said arch in upright position above said side members, said arch constituting the only connection between the rear ends of said side members, a pair of resiliently supported hooks depending from the upper portion of said arch to suspend a boat from said arch, a transverse cradle bar detachably secured at its ends to said side members near the curved forward end portions thereof, a boat-supporting cradle on said cradle bar, a perforated angle plate secured to said towing eye, and a resilient shackle secured to said angle plate and operative to hold a bolt down on said cradle.

2. A boat trailer comprising tubular side members having substantially parallel major portions and curved, converging front end portions, a towing eye secured to the front ends of said side members, a frame arch secured at its ends to the rear ends of said side members and extending upwardly substantially perpendicular to said side members, boat suspending means secured to the upper portion of said arch, a transverse cradle bar extending across said side members at a location spaced from said arch, a boat cradle carried by said cradle bar at the mid-length portion thereof, said cradle bar comprising a tubular member having its end portions flattened and bent to provide hooks fitting over said tubular side frame members, and latching means securing said bar in boat-supporting position on said side members comprising a plate pivotally secured to said cradle bar and positioned to underlie a side member received in the corresponding cradle-bar hook, and a slidable keeper surrounding said cradle bar and said plate and movable along said cradle bar between a position holding said plate in overlying relation to the associated hook and a position freeing said plate for movement away from said hook.

ANFIN S. HEGGEN.

REFERENCES CITED

The following references are of record in the file of this patent:

UNITED STATES PATENTS

| Number | Name | Date |
|---|---|---|
| 1,531,180 | Erickson | Mar. 24, 1925 |
| 1,655,454 | Clay | Jan. 10, 1928 |
| 1,779,887 | Melanson | Oct. 28, 1930 |
| 2,260,676 | Lafaye | Oct. 28, 1941 |
| 2,375,754 | Ballinger | May 15, 1945 |